Figure 1:
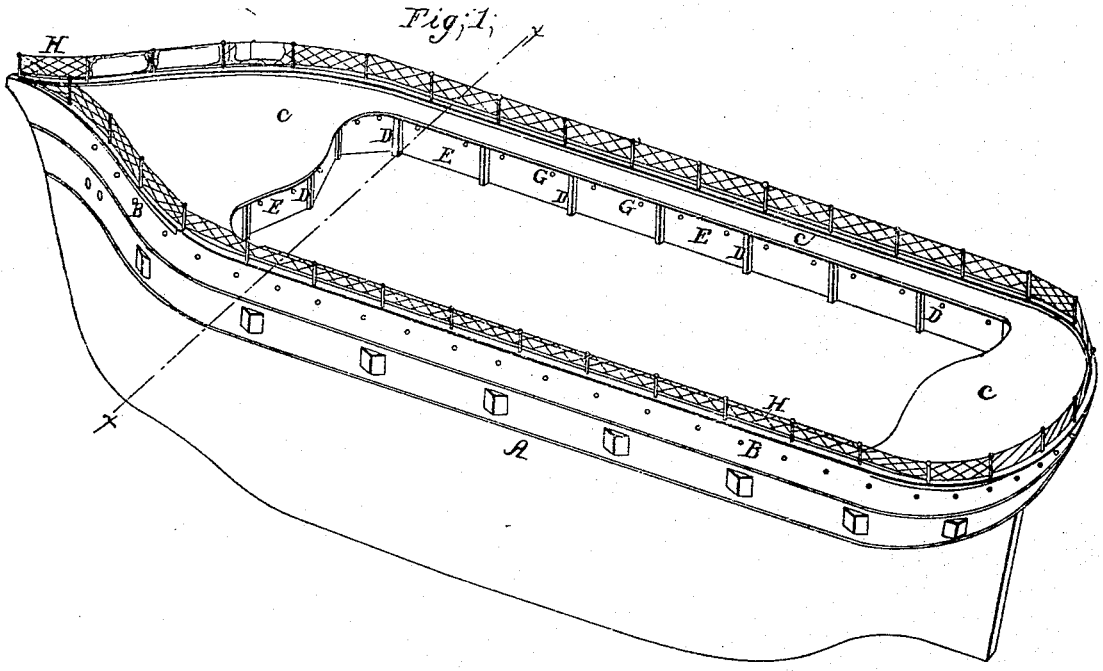
Figure 2:
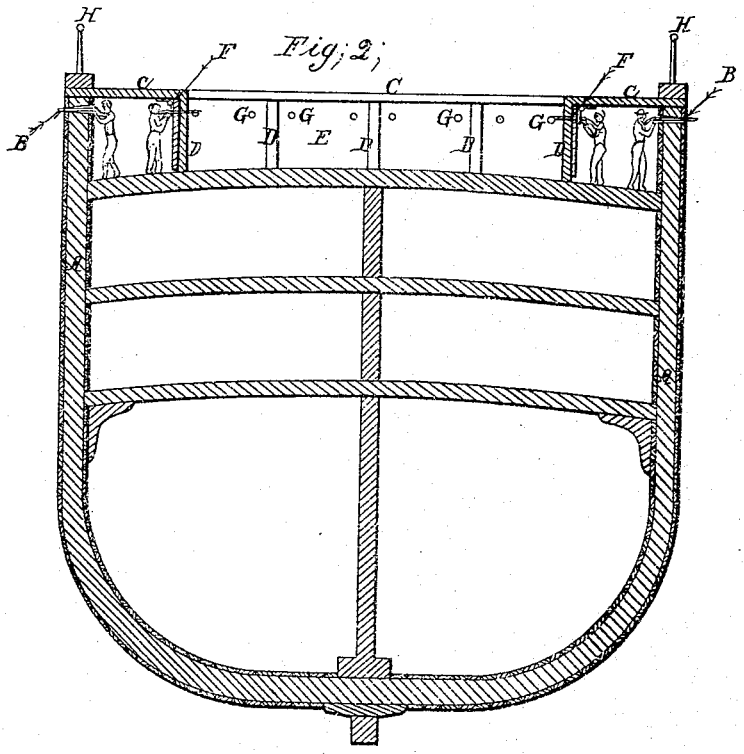

W. Ballard.

Building.

No. 146. A. I. Patented Jul. 1, 1856.

N. PETERS, PHOTO-LITHOGRAPHER, WASHINGTON, D. C.

DOCUMENT NUMBER AI 146

DOCUMENT MISSING PAGE

All Text